Aug. 1, 1972        J. F. WEHNER        3,681,306
EPDM POLYMERIZATION PROCESS
Filed Oct. 24, 1969
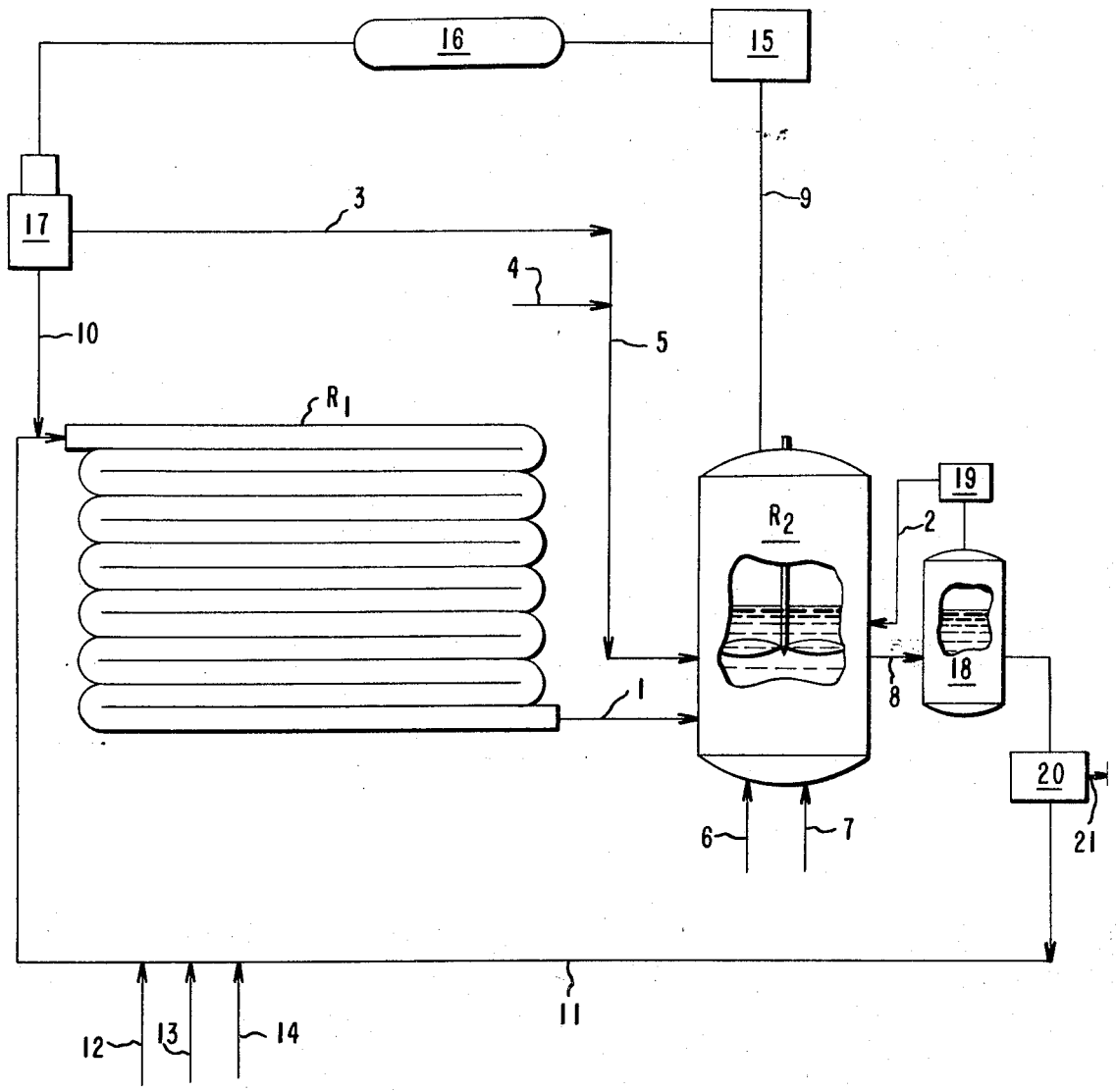
INVENTOR
JOHN FRANCIS WEHNER
BY *Raymond E. Blomsted*
ATTORNEY United States Patent Office 3,681,306
Patented Aug. 1, 1972

3,681,306
EPDM POLYMERIZATION PROCESS
John Francis Wehner, Wilmington, Del., assignor to E. I. du Pont de Nemours and Company, Wilmington, Del.
Filed Oct. 24, 1969, Ser. No. 869,161
Int. Cl. C08f 1/28, 15/04, 15/40
U.S. Cl. 260—80.78                     9 Claims

ABSTRACT OF THE DISCLOSURE

Process for producing an ethylene/($C_3$–$C_{18}$) alpha-olefin copolymer having good processability by polymerizing the monomers in at least two consecutive stages under stable polymerization conditions at a temperature less than about 150° C. at an average ethylene/alpha-olefin molar ratio in one stage at least 1.3 times the ratio in the other stage, to produce a copolymer containing 20–80% by weight ethylene units and having a molecular weight distribution at least 20% broader than that of a similar polymer prepared in a single stage.

---

This invention concerns a process for producing ethylene/alpha-olefin copolymers having improved processing properties.

Ethylene/alpha-olefin copolymers and methods of producing them are well known. Terpolymers of this class, such as ethylene/propylene/diene (EPDM) terpolymers, have achieved fairly widespread use, particularly those in which the diene is 1,4-hexadiene, 5-methylene-2-norbornene, 5-ethylidene-2-norbornene or dicyclopentadiene. Some polymers of this type, however, exhibit characteristics which have them difficult to handle, formulate or process into useful articles. While these shortcomings can usually be overcome by means of additives or blending with other polymers having more desirable properties, such additional mixing or blending operations are expedients which add time and expense to the manufacturing process. Also blending sometimes fails to produce a uniform product and the method of blending may bear upon the results. Blending in solution is not always equivalent to blending in a melt with respect to properties of the blend produced. Such unpredictability of product properties is a problem which manufacturers universally seek to avoid, and preferably in a simple inexpensive manner.

There has been a need for a simple polymerization process which would permit tailor-making of ethylene/alpha-olefin copolymers having predetermined properties, particularly properties which contribute substantially to processing the polymers in commercial applications. These include low cold-flow, high green strength and good millability. Such a process, which also reduced catalyst cost, would represent a substantial advance in the art.

In accordance with this invention ethylene and at least one ($C_3$–$C_{18}$) alpha-olefin are polymerized in the presence of a coordination catalyst in at least two stages, preferably at temperatures less than about 150° C. The average ratio of ethylene/($C_3$–$C_{18}$) alpha-olefin in one stage is at least 1.3 times this ratio in the other and sufficiently higher than the ratio in said other stage to produce a polymer which is more ethylene-rich and has a higher number-average molecular weight than that produced in said other stage. For a back-mixed pot reactor the value of the average ethylene/($C_3$–$C_{18}$) alpha-olefin molar ratio is about equivalent to the value of the molar ratio of these monomers in the effluent stream. For a pipeline reactor the average ratio value is an average of ethylene/($C_3$–$C_{18}$) alpha-olefin ratio values for the streams entering and leaving the reactor; for low conversion pipeline reactors this average can be approximated by the arithmetic average; for high conversion pipeline reactors (and for other reactor configurations), the appropriately weighted average can readily be determined by those skilled in the art. When the process of this invention is run in two sequential steps in the same reactor, the ethylene/($C_3$–$C_{18}$) alpha-olefin molar ratio values for each step is the actual value for the molar ratio of these monomers during the step.

The production of polymer is divided between the stages such that no less than 5% of the total material produced is formed in any one stage. Preferably at least about 10% of the copolymer is produced in each stage. The final polymer product contains 20–80% ethylene units by weight and has a molecular weight distribution at least 20% broader as measured by the increase in the value of the ratio of the weight average to number average molecular weights, than that of a polymer with the same monomer proportions prepared in a single stage under the reaction conditions of either of said stages. Preferably the polymer produced is an ethylene/propylene/non-conjugated diene terpolymer, the diene having only one polymerizable double bond.

Polymerization in each stage is conducted in the presence of a conventional coordination catalyst under steady state (stable) polymerization conditions generally utilized in the art in conducting continuous polymerization of alpha-olefins to produce copolymers. The final polymer product is characterized by improved processability, as compared to a polymer containing the same monomer unit proportions produced under the conditions existing in either stage alone. The process is particularly useful for producing polymers having predetermined properties without further blending or otherwise modifying the polymer.

The invention will be more easily understood by reference to the drawing which illustrates a schematic flowsheet of one embodiment of the invention. Tubular reactor $R_1$ is a pipe 360 meters long with an internal diameter of 0.3 meter and is operated adiabatically. Pot reactor $R_2$ is an isothermal evaporatively cooled (by evaporation of contents) stirred reaction vessel. The pipeline is folded on itself to give a compact bundle and is operated at a maximum temperature of about 50° C. Residence time in the pipeline is about 10 minutes in this embodiment.

Premixed coordination catalyst at —15° C. is introduced into the pipeline inlet by line 12 continuously to maintain a concentration of $3.5 \times 10^{-5}$ gram atoms of vanadium per liter of liquid in the pipeline. The catalyst is continuously prepared prior to introduction by combining vanadium tris(acetyl acetonate) in methylene chloride with 15 molar proportions of diisobutyl aluminum chloride in hexane in a mixer with a residence time of about four seconds.

Monomers and hexane are continuously introduced to the pipeline inlet by streams 10, 12, 13 and 14 to maintain a feed having the following molar proportions:

Ethylene _____ .083
Propylene _____ 0.5
1,4-hexadiene _____ 0.01
Hexane _____ 0.407

Production of polymer in the pipeline is 2250 kg. per hour having an inherent viscosity (0.1% solution by weight in tetrachloroethylene at 30° C.) of about five and the following monomer unit compositions by weight:

Ethylene _____ 65.5
Propylene _____ 33
1,4-hexadiene _____ 1.5

The ratio of its weight to number-average molecular weights is about 2 ($\overline{M}_w$=about 476,000; $\overline{M}_n$=about 230,000).

Polymer reaction product mixture passes from the pipeline reactor $R_1$ by line 1 to pot reactor $R_2$ which is operated at 40° C., 5.25 kg./cm.$^2$ (absolute) and a residence time of 30 minutes with stirring. Additional vanadium catalyst is added by line 6 to raise the vanadium concentration in the pot to twice that in the pipeline. Rejuvenation of catalyst also occurs in the pot reactor due to the addition of benzotrichloride, triisobutyl aluminum and diisobutyl aluminum chloride by lines 6 and 7. Catalyst components are present in the pot reactor liquid in the following forms:

Vanadium (gram atoms per liter)=7×10$^{-5}$
Aluminum (atoms)/vanadium (atoms)=40
Benzotrichloride (moles)/vanadium (atoms)=20
Triisobutyl aluminum/diisobutyl aluminum chloride (mol/mol)=2

The catalyst in the pot reactor is made in situ and the reaction mixture is provided by line 1 from the pipeline reactor and by recycle streams 2 and 3 containing solvent and monomers. Makeup ethylene is added by line 4. The respective flow rates (kg./hr.) are as follows:

| Line | 1 | 4 | 3 | 2 |
|---|---|---|---|---|
| Component: | | | | |
| Hexane | 59,625 | | | 29,475 |
| Ethylene | 2,205 | 6,761 | 17,111 | 738 |
| Propylene | 36,000 | | 26,719 | 11,025 |
| 1,4-hexadiene | 1,361 | | | 470 |
| Copolymer | 2,250 | | | |

The molar ratio propylene/ethylene ($X_p/X_E$) in the liquid phase of reactor $R_2$ is 10. Line 6 introduces additional vanadium compound and benzotrichloride to reactor $R_2$ and both aluminum alkyls are added by stream 7.

The ratio of the weight to number-average molecular weight of the polymer formed in reactor $R_2$ is about 2 ($\overline{M}_w$=about 116,000; $\overline{M}_n$=about 56,000).

Polymer (ethylene/propylene/1,4-hexadiene) is recovered from reactor $R_2$ in the amount of about 11,250 kg./hr. and has a Mooney viscosity ML-4 at 121° C. of about 55. The polymer has the following monomer unit composition:

| | Weight percent |
|---|---|
| Ethylene | 60.1 |
| Propylene | 36 |
| 1,4-hexadiene | 3.9 |

Product stream 8 removes the reaction product mixture containing solvent, catalyst residues, and unreacted monomers in the following proportions:

| | Proportions (kg./hr.) |
|---|---|
| Hexane | 89,100 |
| Ethylene | 738 |
| Propylene | 11,025 |
| 1,4-hexadiene | 1,427 |
| Copolymer | 11,250 |
| Catalyst residues. | |

Effluent vapor stream 9, otherwise referred to as the monomer cooling loop, removes from the pot reactor 20,790 kg./hr. of ethylene and 59,400 kg./hr. of propylene and a minor amount of hexane and hexadiene. This gaseous mixture is compressed in compressor 15, condensed in condenser 16 before being purged of various gaseous contaminants in purge pot 17, leaving 3,679 kg./hr. of ethylene and 32,681 kg./hr. of propylene along with the minor amounts of hexane and hexadiene to be recycled via stream 10 to the inlet of the pipeline reactor, the remainder being returned via streams 3 and 5 to the stirred pot.

Polymer product and solvent are removed from reactor $R_2$ by line 8 and separated from monomers which are compressed and condensed by conventional means 19 and recycled to reactor $R_2$ by line 2. Solvent and hexadiene after separation from polymer by conventional means 20 are recycled to the pipeline reactor via stream 11 at the respective rates of 59,625 and 956 kg./hr. Polymer is recovered by line 21.

The ratio of the weight to number-average molecular weights of the product polymer is 2.63 ($\overline{M}_w$=about 188,500; $\overline{M}_n$=about 71,900).

It is not necessary to use the combination of a pipeline reactor and pot reactor described in the above specific embodiment. Two or more pipeline reactors can be used in series or two or more pot reactors can be used in series or a single reaction vessel can be used by changing the conditions within it after an initial threshold conversion of monomers to polymers has been achieved. In other words a variety of apparatus for carrying out the invention can be utilized so long as the necessary environmental conditions are met. A pipeline reactor is preferred for the first stage and a pot reactor for the second because this arrangement permits convenient attainment of the conditions required.

Useful guidelines for adjusting reaction variables to achieve optimum results in accordance with this invention are illustrated by the polymerization of ethylene, propylene and 1,4-hexadiene in two consecutive back-mixed reactors (pot reactors vigorously agitated to attain equilibrium conditions). The coordination catalyst utilized is made in situ by introducing vanadium tri(acetylacetonate) and diisobutyl aluminum monochloride, the aluminum/vanadium atomic ratio being 8/1. Each reactor makes ethylene/propylene/1,4 - hexadiene copolymer containing about 3% by weight 1,4-hexadiene and the propylene content is 28–48% by weight as shown in Table I. In each reactor the polymer molecular weight distribution $\overline{M}_w/\overline{M}_n$ (weight average molecular weight/number average molecular weight) is about 2/1. The molecular weight distribution for the composite polymer leaving reactor 2 depends upon the number average molecular weight and the amount of copolymer made in each reactor. The novel polymer of the present invention is produced by maintaining the ethylene/propylene ratio in one stage (reactor) at least 1.3 times the ratio in the other stage and controlling temperature, residence time and monomer concentration to offset or reinforce the effect caused by ethylene/propylene ratio control. The magnitude of these effects varies over the permissible range of these variables; for example, residence time has a much greater effect at low temperatures than at high temperatures and propylene mole fraction has a greater effect at low monomer concentrations than at high monomer concentrations.

Illustrative useful ranges of important reaction variables are as follows: reaction residence time ($\phi$) is 2–180 minutes or longer and preferably 10–30 minutes; reactor temperature (T) is −40° C. to +100° C. and preferably 20–60° C.; propylene mole fraction ($X_P$) based on all liquids in the reactor liquid phase is 0.02–0.7 and preferably 0.1–0.4; ethylene/propylene mole ratio ($E_E/X_P$) is 0.01–0.30 and preferably 0.05–0.15. The upper limit of $X_E/X_P$ varies with polymer solubility and catalyst type.

To illustrate how the various reaction variables can be coordinated to produce polymers of the present invention, low, high and average values (L, A and H, respectively) are assigned in Table I below to preferred reaction conditions:

TABLE I

| Variable | Low value | Average value | High value |
|---|---|---|---|
| $\phi$ (min.) | 10 | 20 | 30 |
| T (° C.) | 20 | 40 | 60 |
| $X_P$ | 0.1 | 0.25 | 0.4 |
| $X_E/X_P$ | 0.05 | 0.1 | 0.15 |
| Percent P in copolymer | 48 | 36 | 28–30 |

Table II illustrates various combinations of low, average and high (L, A and H) values which can be utilized within the preferred reaction conditions. One skilled in the art can readily determine other combinations with other catalysts and reaction types.

TABLE II

| Case | Reactor No. 1 | | | | Reactor No. 2 | | | |
|---|---|---|---|---|---|---|---|---|
| | $\phi$ | T | $X_P$ | $X_E/X_P$ | $\phi$ | T | $X_P$ | $X_E/X_P$ |
| 1 | A | A | A | H | A | A | A | A |
| 2 | H | L | H | H | A | A | A | A |
| 3 | A | L | L | H | A | H | H | L |
| 4 | L | L | A | H | H | H | A | L |
| 5 | L | A | H | H | H | A | L | L |
| 6 | A | H | H | H | A | L | L | L |
| 7 | H | L | L | H | L | H | H | L |

In Table II Case 1 shows the invention particularly well because the conditions in Reactors 1 and 2 are the same except for the higher $X_E/X_P$ in Reactor 1. Case 2 maximizes the molecular weight attained in Reactor 1. In Cases 3 to 7, the $\phi$, T and $X_P$ values in Reactor 1 tend to offset each other. Molecular weight tends to increase if the values of $\phi$ and $X_P$ are high and the value of T is low; in Case 3 low T is offset by low $X_P$; in Case 4 low T is offset by low $\phi$; in Case 5 high $X_P$ is offset by low $\phi$; in Case 6 high $X_P$ is offset by high T; and in Case 7 high $\phi$ and low T are offset by low $X_P$.

Any of the coordination catalyst useful for producing EPDM polymers can be used in this invention. These generally comprise a combination of a metal such as vanadium or titanium in the form of its halide or oxyhalide with an organoaluminum compound such as trialkyl aluminum compounds, dialkyl aluminum halides, monoalkyl aluminum dihalides or mixtures thereof. Preferred in this invention are $VCl_4$ or vanadium tris(acetyl acetonate) in combination with a dialkyl aluminum halide or trialkyl aluminum or both. Diisobutyl aluminum chloride and triisobutyl aluminum are preferred organoaluminum compounds as providing an especially orderly and controllable polymerization reaction. Additional useful catalysts are disclosed in U.S. 3,113,115, U.S. 2,962,451 and Linear and Steroaddition Polymers, N. G. Gaylord and H. F. Mark, Interscience Publishers, Inc., N.Y. (1959).

The polymerization is desirably carried out at a temperature of less than about 100° C., especially when a vanadium catalyst is utilized, to avoid rapid deterioration of the catalyst. Titanium catalyst can be employed at higher temperatures exceeding 125° C., but there is little advantage in higher temperatures. Preferably the polymerization reaction is conducted at 20–60° C. with vanadium based coordination catalyst and 20–150° C. with titanium catalyst, the particular temperature being chosen to provide a convenient reaction rate and to achieve good catalyst efficiency. Conventional pressures are utilized.

A polymer produced by the process of this invention has a weight average molecular weight ($\overline{M}_w$) at least 2.4 times and preferably at least 5 times its number average molecular weight ($\overline{M}_n$). Methods for determining these are well known. For determination of number average molecular weight see "Determination of Molecular Weights by Equilibrium Osmotic Pressure Measurements" (pages 10–27), National Academy of Sciences, Washington, D.C. (1968). Weight average molecular weight can be found by light scattering techniques. See, for example, Physical Methods of Organic Chemistry (Part 3, Chapter XXXII, pages 2107–2145), Interscience Publications, Inc., N.Y. (1960).

The polymerization reaction is controlled by varying the proportions of ethylene relative to other monomers in the reaction mixture. It is one of the attributes of the invention that reactor temperature can be maintained practically constant and need not be manipulated to achieve the desirable polymer properties which the invention affords. The concentration of catalyst does not affect the reaction of this invention nor the advantageous results attained. There is an advantage in maintaining a lower temperature in the first reactor stage than in the second, but temperature gradients are entirely unnecessary.

Normally the invention is conducted by maintaining a higher ethylene/alpha-olefin conversion to polymer in the first reactor stage than in the second and it is preferred that the first stage be conducted in a tubular reactor of the type exemplified. The second stage is desirably a well-stirred pot reactor of the type illustrated. This is not essential, however, and two tubular or two pot reactors can be used if monomer ratios, temperature and residence time are controlled to produce the polymer as above described.

In a preferred embodiment ethylene/propylene/1,4-hexadiene polymer is produced in solution under steady state conditions on a continuous basis by conducting the first stage of the reaction in a tubular reactor to achieve about 15–25% of the total polymer production at a propylene/ethylene ratio of at least 3.3:1 in the monomer feed stream. The second stage is a back-mixed well stirred pot reactor which accounts for about 85–75% of the total polymer production and provides continuous flow-through so that the reaction mixture is practically homogeneous and has the same composition as the exit stream containing polymer.

This invention is particularly adapted to produce ethylene/($C_3$–$C_{18}$) olefin copolymer elastomers. Preferred copolymers are ethylene/propylene dipolymers and ethylene/propylene/non-conjugated diene terpolymers in which the diene contains only one polymerizable double bond, that is, only one double bond undergoes polymerization to any practical extent to enter the backbone of the polymer. In forming these polymers the propylene can be replaced by higher alpha-olefins such as butene, pentene, heptene, octene, decene, octadecene and the like but ($C_3$–$C_8$) alpha-olefins are preferred.

Useful dienes include aliphatic and alicyclic dienes such as 1,4-hexadiene, 1,4-heptadiene, 1,5-heptadiene, 4,5-dimethyl - 1,4-hexadiene, 6-methyl-1,5 - heptadiene, 7-methyl-1,6 - octadiene, 5-methyl-1,4 - hexadiene, 1,5-octadiene, 11-ethyl-1,11-tridecadiene, dicyclopentadiene, alkylidene norbornenes such as 5 - methylene - 2 - norbornene, 5-ethylidene-2-norbornene and 5-alkenyl-2-norbornenes such as 5-(2'-butenyl)-2-norbornene.

Additional dienes useful in this invention are described in U.S. 2,933,480 to Gresham et al., U.S. 3,162,620 to Gladding and U.S. 3,093,620 to Gladding et al. The invention is generally useful for copolymerizing ethylene with other monomers utilizing a coordination catalyst.

Ethylene/($C_3$–$C_{18}$) alpha-olefin polymers of this invention preferably contain 20–80% ethylene units. Terpolymers which contain 0.5–15% diene units have the most desirable properties.

Apart from the particular aspects of the invention specifically mentioned, the process is conducted under conditions generally utilized in the art for copolymerizing ethylene with higher alpha-olefins. Any of the conditions known to be useful for this purpose as shown by the above cited patents can be used. Useful solvents include n-hexane, n-heptane and halogenated compounds such as tetrachloroethylene and the like as shown by these patents.

I claim:
1. In the process for producing an elastomeric polymer by copolymerizing ethylene with a ($C_3$–$C_{18}$) alpha-olefin in the presence of a vanadium coordination catalyst the improvement consisting essentially of:
  (a) conducting the polymerization continuously in at least two consecutive stages, the polymerization in each stage being conducted under steady state conditions;
  (b) maintaining the conditions in each stage such that the temperature is −40 to 100° C., the residence time is 2–180 minutes, the α-olefin mole fraction is 0.02–0.7, the average ethylene/($C_3$–$C_{18}$)

alpha-olefin mole ratio is 0.01–0.30, and the average ethylene/($C_3$–$C_{18}$) alpha-olefin mole ratio in one stage is at least 1.3 times the average ratio in said other stage to produce a copolymer that is more ethylene rich and has a higher number average molecular weight than that produced in said other stage;

(c) producing at least five percent of said copolymer in each of said stages, the final copolymer product containing 20–80% by weight ethylene units and having a molecular weight distribution at least 20% broader than that of a polymer of the same monomer proportions prepared in a single stage under the reaction conditions of either of said stages.

2. The process of claim 1 in which ethylene is copolymerized with propylene and a non-conjugated diene having only one polymerizable double bond.

3. The process of claim 2 in which the non-conjugated diene is 1,4-hexadiene.

4. The process of claim 2 in which at least 10% of the copolymer is produced in each stage.

5. The process of claim 2 in which the non-conjugated diene is ethylidene-2-norbornene.

6. The process of claim 1 conducted in two consecutive stages.

7. The process of claim 6 wherein the propylene mole fraction present in each stage is about 0.02–0.7 based on all monomer liquids in a reactor liquid phase.

8. The process of claim 1 wherein the temperature is 20–60° C., the residence time is 10–30 minutes, the $\alpha$-olefin mole fraction is 0.1–0.4 and the average ethylene/($C_3$–$C_{18}$) alpha-olefin mole ratio is 0.05–0.15.

9. The process of claim 1 wherein the polymerization is conducted in solution.

References Cited

UNITED STATES PATENTS

| | | | |
|---|---|---|---|
| 3,162,620 | 12/1964 | Gladding | 260—80.5 |
| 3,454,675 | 7/1966 | Scoggin | 260—878 |
| 3,437,646 | 4/1969 | Scoggin | 260—88.2 |

JOSEPH L. SCHOFER, Primary Examiner

R. A. GAITHER, Assistant Examiner

U.S. Cl. X.R.

260—88.2 R